US011155459B2

(12) United States Patent
Crispel et al.

(10) Patent No.: US 11,155,459 B2
(45) Date of Patent: Oct. 26, 2021

(54) DEVICE AND METHOD FOR FILLING PRESSURIZED GAS TANKS

(71) Applicant: L'Air Liquide, Societe Anonyme pour l'Etude et l'Exploitation des Procedes Georges Claude, Paris (FR)

(72) Inventors: Simon Crispel, Sassenage (FR); Marcus Buck, Wiesbaden (DE); Anh Thao Thieu, Saint Cloud (FR); Vincent Fairy, Houston, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 47 days.

(21) Appl. No.: 16/580,730

(22) Filed: Sep. 24, 2019

(65) Prior Publication Data

US 2020/0095113 A1    Mar. 26, 2020

(30) Foreign Application Priority Data

Sep. 25, 2018    (FR) .................................. FR 1858700

(51) Int. Cl.
*B67D 7/74* (2010.01)
*B67D 7/36* (2010.01)
(Continued)

(52) U.S. Cl.
CPC .............. *B67D 7/743* (2013.01); *B67D 7/36* (2013.01); *B67D 7/58* (2013.01); *B67D 7/78* (2013.01);
(Continued)

(58) Field of Classification Search
CPC . B67D 7/743; B67D 7/36; B67D 7/58; B67D 7/78; B67D 7/82; B67D 2007/0444;
(Continued)

(56) References Cited

U.S. PATENT DOCUMENTS 5,771,946 A * 6/1998 Kooy ........................ F17C 6/00
141/82
5,934,081 A    8/1999 Notaro et al.
(Continued)

FOREIGN PATENT DOCUMENTS

DE    10 2016 009672    2/2018
FR         3 034 836    10/2016
WO    WO 2008/062117    5/2008

OTHER PUBLICATIONS

French Search Report and Written Opinion for FR 1 858 700, dated May 10, 2019.
(Continued)

*Primary Examiner* — Timothy P. Kelly
*Assistant Examiner* — Christopher M Afful
(74) *Attorney, Agent, or Firm* — Christopher J. Cronin

(57) ABSTRACT

Device and method for filling pressurized gas tanks, particularly vehicle pressurized hydrogen tanks, the device comprising a liquefied gas source, a transfer circuit comprising two parallel transfer lines each having an upstream end linked to the liquefied gas source, at least two separate downstream ends intended to be each removably connected to a tank to be filled, each of the two transfer lines comprising: a pump, a vaporizer for evaporating the pumped fluid, a branch for bypassing the vaporizer and a distribution valve(s) set configured to control the flow of fluid pumped and distributed between the vaporizer and the branch line, the device further comprising a storage buffer(s), which storage buffer(s) is(are) connected in parallel to each of the two transfer lines via a set of valves.

19 Claims, 1 Drawing Sheet

(51) Int. Cl.
  *B67D 7/58* (2010.01)
  *B67D 7/78* (2010.01)
  *B67D 7/82* (2010.01)
  *F17C 5/02* (2006.01)
  *B67D 7/04* (2010.01)

(52) U.S. Cl.
  CPC ............... *B67D 7/82* (2013.01); *F17C 5/02* (2013.01); *B67D 2007/0444* (2013.01); *B67D 2007/0451* (2013.01); *B67D 2007/0474* (2013.01); *F17C 2221/012* (2013.01); *F17C 2227/0135* (2013.01); *F17C 2227/0393* (2013.01); *F17C 2250/043* (2013.01); *F17C 2250/0439* (2013.01); *F17C 2270/0168* (2013.01)

(58) Field of Classification Search
  CPC .... B67D 2007/0451; B67D 2007/0474; F17C 5/02; F17C 2221/012; F17C 2227/0135; F17C 2227/0393; F17C 2250/043; F17C 2250/0439; F17C 2270/0168
  See application file for complete search history.

(56) References Cited

U.S. PATENT DOCUMENTS 9,663,345 B2 * 5/2017 Mackey .................. F04D 13/14
10,077,871 B2 * 9/2018 Blanchet .................. F17C 5/06
10,724,767 B2 * 7/2020 Yoshida .................. F17C 5/06

OTHER PUBLICATIONS

Raman, et al, "A rapid fill hydrogen fuel station for fuel cell buses," 12th World Energy Conference, Hydrogen Energy Progress 2, pp. 1629-1642.

Daney, et al., "Hydrogen vehicle fueling station," Advances in Cryogenic Engineering, vol. 41, 1996, pp. 1041-1048.

* cited by examiner

DEVICE AND METHOD FOR FILLING PRESSURIZED GAS TANKS

CROSS-REFERENCE TO RELATED APPLICATIONS

This application claims the benefit of priority under 35 U.S.C. § 119(a) and (b) to French patent application No. FR 1858700, filed Sep. 25, 2018, the entire contents of which are incorporated herein by reference.

BACKGROUND

Field of the Invention

The invention relates to a device for filling pressurized gas tanks.

More particularly, the invention relates to a device for filling pressurized gas tanks, particularly vehicle pressurized hydrogen tanks, the device comprising a liquefied gas source, a transfer circuit comprising two parallel transfer lines each having an upstream end linked to the liquefied gas source, each transfer line comprising a downstream end intended to be removably connected to a tank to be filled.

Related Art

Hydrogen gas refuelling stations using liquid hydrogen sources are known. These known devices make it possible to use the cold from the liquid hydrogen to produce a pre-cooled pressurized gas for rapid filling without excessive increase in the temperature of the gas in the tank during filling.

Cf. for example U.S. Pat. No. 5,934,081 or the article "A rapid fill hydrogen fuel station for fuel cell buses" by V Raman, D. Farese and J Hansel (12th World Energy conference Hydrogen energy Progress 2 p.1629-1642). Cf. also the article "Hydrogen vehicle fueling station" by D. E. Daney, et al. (Advances in Cryogenic Engineering Vol. 41, 1996).

These known arrangements do not make it possible to guarantee satisfactory performances of the facility nor the modularity thereof.

SUMMARY OF THE INVENTION

An aim of the invention is to overcome all or some of the prior art disadvantages stated above.

To this end, the device according to the invention, moreover in accordance with the generic definition given by the preamble above, is essentially characterized in that each of the two transfer lines comprises: a pump, a unit for evaporating the pumped fluid (hereinafter vaporizer), a branch line for bypassing the vaporizer and a distribution valve(s) set configured to control the flow of fluid pumped and distributed between the vaporizer and the branch line, the device further comprising a buffer storage(s) set (hereinafter storage buffer(s)), which storage buffer(s) is(are) connected in parallel to each of the two transfer lines via a valve(s) set.

Moreover, embodiments of the invention can include one or more of the following features:

the buffer storage(s) set is connected to each transfer line between the vaporizer and the point of mixing between the fluid having passed through the vaporizer and the fluid having passed through the branch line, the buffer storage(s) set is connected to each transfer line via a respective expansion valve, the distribution valve(s) set of each transfer line comprises a first distribution valve located downstream of the vaporizer and upstream of the point of mixing with the fluid that has gone through the branch line, the distribution valve(s) set comprising a second distribution valve in the branch line, the storage buffer(s) set comprises two or more than two storage buffers connected in parallel to each transfer line, each of the storage buffers being connected to each transfer line via a respective isolation valve, the transfer circuit comprises a connection duct linking the two transfer lines at the outlets of the two pumps, said connection duct comprising an isolation valve, the two transfer lines comprise at least one thermally insulated portion, the two transfer lines comprise at least one pressure sensor and/or at least one temperature sensor measuring the pressure and the temperature, respectively, particularly in proximity to the downstream end, during at least part of the filling operation, particularly when the determined gas flow rate is less than or equal to the maximum flow rate of the pump, the gas flow rate transferred into the tank is solely formed from the gas flow rate provided by the pump and distributed between the vaporizer and the branch line, the flow rate determined for filling the tank varies between zero and 100 g/second and particularly between 10 and 60 g/second, the pump is a variable speed pump and the gas flow rate transferred into the tank during filling is controlled by controlling the speed of the pump and possibly the quantity of gas provided by the storage buffer(s), the pressurized gas temperature transferred into the tank during filling is controlled by managing the relative distribution between the relatively hot gas passing through the vaporizer and the relatively cold gas passing through the branch line and possibly the quantity of relatively hot gas coming from the storage buffer(s), the additional gas flow rate provided by the storage buffer(s) is controlled in response to a pressure signal measured at the downstream end of the transfer line, the storage buffer(s) comprises several storage buffers connected in parallel to each transfer line and successively used according to a cascade process in order to provide gas to the transfer line or lines.

The invention also relates to a method of filling at least one pressurized gas tank with a determined gas flow rate at a determined temperature to establish a filling determined gradient in the tank, in which the method uses a filling device in accordance with any one of the features above or below.

According to other possible characteristic features:

the gas flow rate is variable and modified over time, during at least part of the filling operation, particularly when the determined gas flow rate is greater than the maximum flow rate of the pump, the gas flow rate transferred into the tank is the sum, firstly, of the gas flow rate provided by the pump and distributed between the vaporizer and the branch line, and, secondly, of an additional gas flow rate provided by the storage buffer(s), the method includes a step of filling a tank with a gas flow comprising the sum of the gas flows provided by the pumps of two transfer lines by transferring a gas flow from one transfer line into the other transfer line, the method comprises, prior to or when starting to fill a tank, a step of cooling said transfer line comprising a transfer of gas at a determined temperature controlled by managing the relative distribution between the relatively hot gas passing through the vaporizer and the relatively cold gas passing through the branch line and possibly the quantity of relatively hot gas coming from the storage buffer(s), the step of cooling said transfer line is carried out by controlling the opening of the distribution valves between the vaporizer and the branch line and a possible additional gas flow rate provided by the buffer storage(s) set according to an "open loop" ("feedforward") type control and/or according to a control loop based on a temperature measured at the transfer line, the step of cooling said transfer line comprises a step of flushing toward the exterior or toward a unit for recovering the gas transferred at a determined temperature controlled in the transfer line to be cooled.

The invention can also relate to any alternative device or method comprising any combination of the features above or below within the scope of the claims.

BRIEF DESCRIPTION OF THE FIGURES

Other characteristic features and advantages will emerge upon reading the following description, with reference to the figures in which.

DETAILED DESCRIPTION OF THE INVENTION

Figure 1:
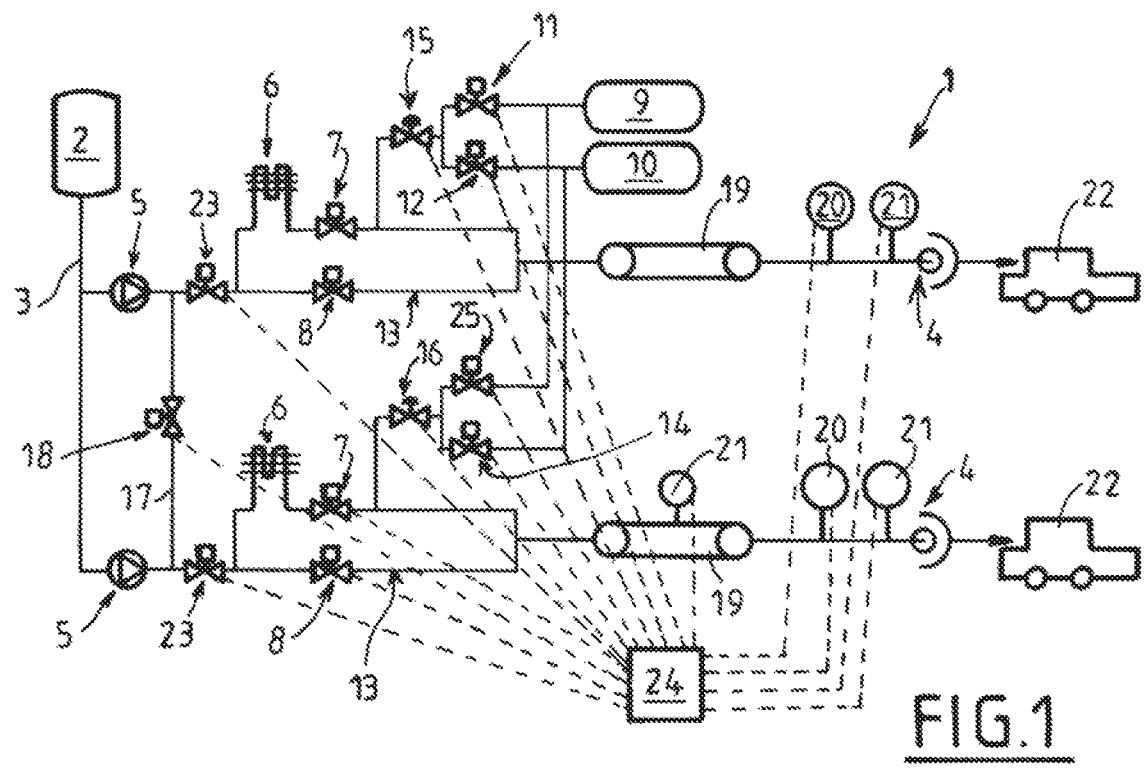
FIG. 1 shows a schematic and partial view illustrating a structure and operating example of a device example according to the invention.

The device 1 for filling pressurized gas tanks (particularly vehicle pressurized hydrogen tanks) which is shown in FIG. 1 comprises a liquefied gas source 2. The liquefied gas source comprises, for example, at least a vacuum-insulated liquefied gas storage and/or a liquefied gas source (a liquefier or any other suitable device).

It should be noted that, in the case where the gas is hydrogen (H2), for the sake of simplicity, the state of the fluids will be designated by terms "gas" or "liquid" that are habitually used, however, depending on the pressure of the fluid, the latter will in fact be a supercritical fluid.

The device 1 comprises a transfer circuit 3 comprising two fluid transfer parallel lines each having an upstream end 3 linked to the liquefied gas source 2 in order to draw liquefied gas therefrom. Each transfer line has a respective downstream end 4 intended to be each removably connected to a tank 22 to be filled (for example via a flexible portion provided with a suitable quick connector and flap(s) where required).

It should be noted that the example of FIG. 1 has two transfer lines but could have more than two transfer lines.

Each of the two transfer lines comprises a pump 5, a unit 6 for evaporating the pumped fluid and a branch 13 for selectively bypassing the vaporizer 6.

Moreover, the lines each comprise a distribution valve(s) 7, 8 set configured to control the flow of fluid pumped and distributed between the vaporizer 6 (where the liquid is heated up and evaporated and therefore relatively hotter and at a relatively high pressure) and the branch line 13 (where the liquid is substantially at the thermodynamic conditions from when exiting the pump 5; therefore relatively cold).

Downstream of the vaporizer 6, the two parallel portions meet at a point of mixing the two relatively hot and cold fluids.

The distribution valves 7, 8 set of each transfer line comprises, for example, a first distribution valve 7 located preferably downstream of the vaporizer 6 and upstream of the point of mixing with the fluid passed through the branch line 13. The distribution valves 7, 8 set can further comprise a second distribution valve 8 in the branch line 13 (upstream of the mixing point).

Of course, any other distribution system could be envisaged, particularly a three-way valve system.

Since the distribution valves 7 are located downstream of the heating unit 6 and upstream of the mixing point, this makes it possible to use valves working at ambient temperature (non-cryogenic) and which manage a relatively low flow rate. This increases the reliability of the facility and limits the cost thereof.

The circuit also preferably comprises, in each transfer line, an upstream valve 23 located between the outlet of the pump 5 and before the evaporating and branch linees.

Conventionally, the temperature of the fluid at the outlet of the filling gun (end 4) can also be controlled via this mixture, in order to be maintained, for example, at a temperature determined particularly between −33° C. and −40° C.

This makes it possible to obtain a gas flow at a determined pressure and temperature provided to fill the tank 22 while limiting heating in the latter.

The vaporizer 6 is, for example, a heater heat exchanger providing heat exchange of the liquid hydrogen with a heat source (air or another heating element).

The device 1 further comprises one or more pressurized gas storage buffer(s) 9, 10 connected in parallel to each of the transfer lines via a respective valve(s) 11-16 set.

This architecture which provides a pump 5 for each transfer line (for each line for filling a tank 22) has many advantages with respect to the known systems. It allows good modularity of the station (several possible simultaneous filling operations, possibility of adding or removing a transfer line without affecting the performances of the other lines, etc.).

Moreover, this solution improves the performances of the device. Indeed, according to this arrangement, the pumps 5 of each of the transfer lines thus have better volumetric and energy efficiency at low pressure in particular.

Indeed, the fact of dedicating one pump 5 per transfer line ("dispenser") makes it possible to provide the hydrogen at the pressure required by the tank 22 to be filled by limiting the performance loss, the wear of the pump 5 and the Joule-Thompson expansion losses.

Each pump 5 can thus be fully used in an area of use providing the best energy and volumetric efficiency thereof at a relatively low pressure between 200 bar and 900 bar (instead of the range between 700 and 900 bar when a single pump is connected directly to the storage buffers and is used for several transfer lines). Such a low-pressure operation allowed by the invention makes it possible to reduce the energy consumption of the pump by as much as 50%.

As illustrated in FIG. 1, the storage buffers 9, 10 are preferably connected to each transfer line between the vaporizer 6 and the mixing point between the fluid having passed through the vaporizer 6 and the fluid having passed through the branch line 13.

For example, the storage buffers 9, 10 can be connected in parallel to each transfer line via a respective expansion valve 15, 16. Moreover, each storage buffer 9, 10 can comprise a respective isolation valve 11, 12 located between the inlet/outlet of the storage 9, 10 and each expansion valve 15, 16.

These storage isolation valves 11, 12, 25, 14 separated for each dispenser transfer line make it possible to share the buffer storages while keeping the transfer lines independent.

As shown in FIG. 1, the transfer circuit 3 can advantageously comprise at least one connection duct 17 linking two transfer lines (or more) at the outlets of the pumps 5. The connection duct 17 comprises, for example, an isolation valve 18. This connection duct 17 and the valve 18 thereof allow, where applicable, sharing (adding) of the pumped flows when required (for example when filling large tanks and/or when a pump has broken down).

As shown in the diagram of FIG. 1, at least one portion 19 of each transfer line can be thermally insulated (not necessarily under vacuum and/or cooled). Moreover, each line can comprise at least one pressure sensor 20 and/or at least one temperature sensor 21 measuring the pressure/temperature therein, particularly in proximity to the downstream end for connecting to a tank 22.

All or some of the valves can be valves managed, for example, by an electronic controller 24 comprising a microprocessor and/or a computer provided with a data acquisition, storage and processing system. The controller 24 can be linked to the sensors and various other units of the device (pumps 5 in particular) to acquire data, control and manage these units.

Figure 2:
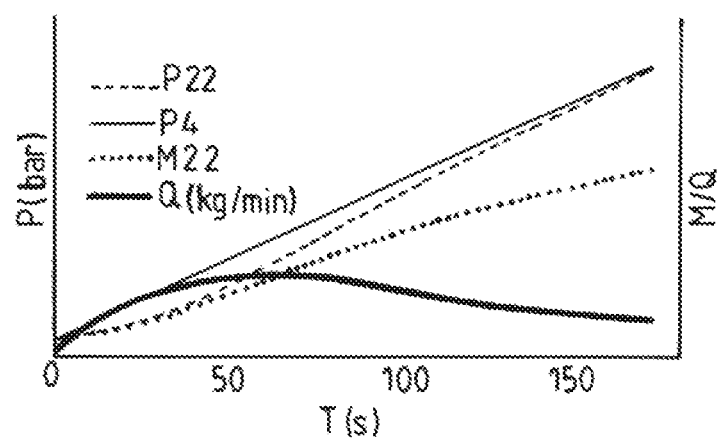
FIG. 2 shows a parameter development graph according to a possible example of filling according to the invention.

As illustrated in FIG. 2 by way of nonlimiting example, the filling of a tank is preferably produced according to a filling (pre)defined gradient. For example, the pump 5 and the set of valves is managed such as to provide a determined pressure increase speed in the tank (P22=pressure in the tank), for example mainly linear. For example, the pressure P4 measured in the transfer duct 4 (and representing the pressure P22 in the tank 22) is controlled such as to linearly increase over time. This can be obtained by controlling the mass M22 in the reservoir 22 over time T and therefore the flow rate Q of gas transferred over time. This flow rate is defined according to the filling conditions (quantity, volume of the tank, temperature, etc.).

Transfer of the required gas flow rate can be provided by the pump 5 and possibly supplemented by an additional gas flow rate provided by the storage buffer(s) 9, 10.

In a nominal filling case, a tank must be filled, for example, with 5 to 7 kg of hydrogen at an ambient temperature of 15° C. in a few minutes (three minutes for example) according to a filling gradient defined by a filling protocol.

For example, at the start of filling, the pump 5 alone can be sufficient to provide the flow rate necessary to fill the vehicle. Depending on the pressure gradient, this flow rate increases from zero from the start of filling up to a maximum flow rate of the pump.

The pressure gradient is managed (obtained) for example by modulating the speed of the pump 5. The pressure provided by the pump 5 is the pressure required at the end of the transfer line by the tank 22 to be filled. This pressure can typically be approximately from 50 to 300 bar as a function of the initial pressure of the tank 22.

The hydrogen passes via the heated vaporizer 6, while the branch line 13 makes it possible to transport cryogenic hydrogen at the outlet temperature thereof from pump 5.

The opening of the two valves 7, 8 can be managed to reach the appropriate distribution in order to reach a target gas temperature at the downstream end 4.

If the line is too hot (temperature measured 21 above a target temperature), the valve 7 on the "hot" side can be closed completely in particular and the valve 8 on the "cold" side can be opened for example completely in order to allow through 100% of the cold flow rate in order to cool the line.

If the line is cold, the cold flow rate/hot flow rate ratio can be regulated by the valves 7, 8 for example between 30% and 50% as a function of the performance of the pump 5 and/or of the ambient temperature.

As the tank 22 fills up, the filling flow rate can increase and can particularly exceed the capacity of the pump 5.

The controller can detect 20 a lack of pressure at the line with respect to a target pressure and, to overcome this, can open the valve or valves 11, 15 of the storage buffers.

This means that the control of the flow rate of the pump and the flow rate provided by the storage buffers can be controlled in order to provide a pressure setpoint measured in the transfer line (particularly at the downstream end).

In this configuration, the pump 5 can be at the maximum flow rate thereof (maximum speed), and the pressure gradient is managed by the expansion valve 15.

The pressure provided by the pump 5 (like the pressure at the transfer line) increases until reaching the filling end pressure (for example 700 to 850 bar). Where applicable, the storage buffers 9, 10 can be used as a cascade (the valves 11, 12; 25, 14 associated with the storage buffers allowing switching from one storage to the other).

The hydrogen provided by the storage buffers 9, 10 joins the flow rate coming from the pump 5 after having been expanded in the corresponding valve 15, 16. The valves 7, 8 always control the temperature of the provided gas.

The flow rate provided in this second filling stage is greater, for example approximately 25-45 g/s with a peak that can reach 60 g/s for example.

With the hot gas flow rate provided by the storage buffer(s) 9, 10 also being variable and large, the ratio between the cold gas and the hot gas provided by the pump 5 is greater than during the start of filling. This ratio can vary, for example, between 30% and 100% depending on the filling total flow rate.

When filling is finished, the pump 5 can be used to fill the storage buffer(s) 9, 10 up to the nominal pressure thereof. All of the pumped hydrogen can be heated to the storage pressure (400-500 bar for a medium-pressure storage buffer and 700-1000 for a high-pressure storage buffer).

In certain cases, filling only requires a low flow rate, which is sufficiently low to be fully provided by the pump 5 (small tanks with a capacity less than 4 kg of hydrogen, for example). Low flow rate filling can also be provided when the ambient temperature is (extremely) high, for example above 30° C. or 40° C.

In this case, the expansion valve 15, 16 can remain closed during filling. The pressure gradient can be completely managed by the speed of the pump 5. The cold flow rate/hot flow rate ratio is regulated by the corresponding valves 7, 8 and can be varied, for example, between 30% and 50% except for cooling the lines as is described above.

In the case of a large flow rate required for filling large tanks 22 (such as bus tanks storing more than 10 kg of hydrogen), the required flow rate and the necessary cooling power are relatively large. Such rapid filling is always possible by providing a high filling flow rate at a transfer line. This can be achieved by using two pumps 5 and controlling the appropriate valves and particularly by opening the valve 18 of the connection duct 17.

This layout therefore makes it possible to double the capacity of a transfer line and provide the station 1 with flexibility of use.

As stated above, the arrangement also allows effective cooling of the transfer lines.

Indeed, after a lengthy standby time, the transfer line or lines can heat up. Cooling can cause problems on the stations from the prior art.

According to the proposed architecture, the transfer lines can be easily cooled in several ways.

For example, the line can be cooled using so-called "direct" cooling with the cold fluid transferred into the tank 22 at the very start of filling. Indeed, at the start the filling, there can be a tolerance time window (often approximately 30 seconds) during which the tank 22 can be filled with a gas that is not sufficiently cooled (above the target temperature). If the transfer line is sufficiently short (for example less than thirty or twenty metres), the cryogenic hydrogen at the outlet of the pump 5 can be sent directly into the tank 22 after having cooled the line during the tolerance window.

The temperature control of the temperature of the line can be achieved using a correction of open loop ("feedforward") type or "in a cascade" as a function of the measured temperature 21 of the line (for example the temperature of the gas in the line). This means that the opening setpoints for the valves 7, 8 in particular are automatically controlled or forced to the value of the temperature measured downstream.

According to another possible cooling mode (so-called "cold flushing"), the line can be cooled by a dedicated cold gas flow which is not used to fill the tank 22.

Indeed, for longer transfer lines, "direct cooling" can prove to be insufficient. It can then be envisaged to add a flushing line. Thus, before filling the tank 22, the line can be flushed with cold hydrogen provided by the pump 5 and sent back to a storage buffer 9, 10 by a flushing line (not shown for the sake of simplicity).

This flushing stage can be carried out once the tank is connected to the downstream end of the transfer line and while the user manipulates an interface before actual filling. This can even be carried out in advance by detecting the arrival of a client/user/vehicle. This flushing stage can require some tens of seconds depending on the length of the lines and the ambient temperature.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for filling pressurized gas tanks, comprising: a liquefied gas source containing liquefied gas; a storage buffer(s); and a transfer circuit, the transfer circuit comprising two parallel transfer lines each having an upstream end linked to the liquefied gas source, each of the two parallel transfer lines comprising a downstream end intended to be removably connected to a tank to be filled, each of the two transfer lines comprising: a pump for pumping the liquefied gas, a vaporizer line receiving the pumped liquefied gas from the pump, a vaporizer disposed in the vaporizer line for evaporating a first portion of the pumped liquefied gas, a branch line receiving a second portion of the pumped liquefied gas and allowing the second portion of liquefied gas to bypass the vaporizer, and at least one distribution valve, the at least one distribution valve being configured to control a flow of pumped liquefied gas and distributed between the vaporizer and the branch line, the storage buffer(s) being connected in parallel to each of the two parallel transfer lines via a set of valves, the two parallel transfer lines comprising first and second parallel transfer lines, wherein:
the vaporizer line and the branch line of the first parallel transfer line split off from one another downstream of the pump of the first parallel transfer line and upstream of a mixing point where evaporated fluid from the vaporizer of the first parallel transfer line is mixed with the pumped liquefied gas in the branch line of the first parallel transfer line; and
the transfer circuit comprises a connection duct linking the two parallel transfer lines at outlets of the two pumps, said connection duct comprising an isolation valve.

2. The device of claim 1, wherein the buffer storage(s) set is connected to each of the two parallel transfer lines between the vaporizer and the point of mixing between the fluid having passed through the vaporizer and the fluid having passed through the branch line.

3. The device of claim 1, wherein the set of valves connecting the storage buffer(s) and each of the two parallel transfer lines comprises expansion valves each one of which is associated with a respective one of the two transfer lines.

4. The device of claim 1, wherein each of the at least one distribution valves comprises a first distribution valve located downstream of the vaporizer and upstream of a mixing point where fluid that has gone through the branch line from the pump is mixed with fluid that has not gone through the branch line from the pump and a second distribution valve located in the branch line.

5. The device of claim 1, wherein the storage buffer(s) comprises two or more storage buffers connected in parallel to each of the two parallel transfer lines and the set of valves includes a respective two or more isolation valves, each storage buffer being connected to each transfer line via a respective one of said isolation valves.

6. The device of claim 1, wherein the two parallel transfer lines comprise at least one thermally insulated portion.

7. The device of claim 1, wherein each of the two parallel transfer lines comprises at least one pressure sensor and/or at least one temperature sensor measuring a pressure and temperature of pressurized gas in a respective one of the two parallel transfer lines.

8. The device of claim 1, wherein the pressurized gas tanks are vehicle pressurized hydrogen tanks.

9. The device of claim 1, wherein:
the two parallel transfer lines comprise first and second transfer lines;
the at least one distribution valve of the first transfer line comprises a first distribution valve downstream of the pump of the first transfer line and upstream of the vaporizer and the branch lines of the first transfer line, a second distribution valve downstream of the vaporizer of the first transfer line and upstream of the mixing point of the first transfer line, and a third distribution valve disposed in the branch line of the first transfer line; and
control of the openings of the second and third distribution valves of the first transfer line operates to control relative amounts of the liquefied gas pumped by the pump of the first transfer line that are allocated between the vaporizer line of the first transfer line and the branch line of the first transfer line.

10. A method of filling at least one pressurized gas tank with a determined gas flow rate at a determined temperature to establish a determined filling gradient in the tank, comprising the steps of:
providing the filling device of claim 1, wherein the downstream end of the first parallel transfer line is connected to a first tank to be filled;
pumping a first flow of liquefied gas from the liquefied gas source with the pump of the first parallel transfer line;
allowing a first portion of the pumped flow of liquefied gas to be evaporated at the vaporizer of the first parallel transfer line;
allowing a second portion of the pumped flow of liquefied gas to flow through the branch line thereby bypassing the vaporizer of the first parallel transfer line;
allowing the first portion of the pumped flow of liquefied gas that has evaporated in the vaporizer of the first parallel transfer line to mix with the second portion of the pumped flow of liquefied gas from the branch line to provide a r flow of gas;
controlling the relative amounts of the first and second portions of the pumped flow of liquefied gas from the pump of the first parallel transfer line allocated between the vaporizer of the first parallel transfer line and the branch of the first parallel transfer line using the at least one distribution valve of the first parallel transfer line; and
filling the first tank with pressurized gas obtained either from the storage buffer(s), from a combination of the first flow of gas and pressurized gas from the storage buffer(s), or directly from the first flow of gas.

11. The filling method of claim 10, wherein a flow rate of the first flow of gas is variable and modified over time.

12. The filling method of claim 10, wherein, when a flow rate of pressurized gas used to fill the first tank is greater than a maximum flow rate of the pump of the first parallel transfer line, the pressurized gas used to fill the first tank is obtained from the combination of the first flow of gas and pressurized gas from the storage buffer(s).

13. The method of claim 10, wherein, when a flow rate of pressurized gas used to fill the first tank is less than or equal to a maximum flow rate of the pump of the first parallel transfer line, the pressurized gas used to fill the first tank is obtained from the first flow of gas and not from the storage buffer(s).

14. The method of claim 10, further comprising the steps of:
pumping a second flow of liquefied gas from the liquefied gas source with the pump of the second parallel transfer line;
allowing a first portion of the pumped flow of liquefied gas to be evaporated at the vaporizer of the second parallel transfer line;
allowing a second portion of the pumped flow of liquefied gas to flow through the branch for bypassing the vaporizer of the second parallel transfer line;
allowing the first portion of the pumped flow of liquefied gas that has evaporated in the vaporizer of the second parallel transfer line to mix with the second portion of the pumped flow of liquefied gas that has bypassed the vaporizer of the second parallel transfer line to provide a second flow of gas; and
controlling the relative amounts of the first and second portions of the pumped flow of liquefied gas from the pump of the second parallel transfer line allocated between the vaporizer of the second parallel transfer line and the branch of the second transfer line using the at least one distribution valve of the second parallel transfer line, wherein the second flow of gas is transferred from the second parallel transfer line to the first parallel transfer line and the pressurized gas used to fill the first tank is obtained from a sum of the first and second flows of gas.

15. The method of claim 10, wherein, prior to or when starting to fill the first tank, a predetermined temperature of the pressurized gas used to fill the first tank is controlled through the relative allocation of the first flow of liquefied gas from the liquefied gas source with the pump of the first parallel transfer line between the relatively hotter gas resulting from evaporation of the first portion of pumped liquefied gas of the first parallel transfer line and the relatively colder liquid of the second portion of pumped liquefied gas of the first parallel transfer circuit passing through the branch bypassing the vaporizer of the first parallel transfer circuit.

16. The method of claim 15, wherein said relative allocation of the first flow of liquefied gas is carried out by controlling an opening of the at least one distribution valve(s) of the first parallel transfer line according to an open loop feedforward type control and/or according to a control loop based on a temperature measured at the downstream end of the first parallel transfer line.

17. The method of claim 15, wherein the predetermined temperature of the pressurized gas used to fill the first tank is also controlled through the relative allocation of the pressurized gas used to fill the first tank between the first flow of gas and a flow of relatively hotter pressurized gas from the storage buffer(s).

18. The method of claim 17, wherein said relative allocation of the first flow of liquid and said relative allocation of the pressurized gas used to fill the first tank is carried out by controlling openings of the at least one distribution valve(s) of the first parallel transfer line and of the valve set according to an open loop feedforward type control and/or according to a control loop based on a temperature measured at the downstream end of the first parallel transfer line.

19. The method of claim 15, further comprising the step of flushing the pressurized gas used to fill the first tank from the downstream end of the first parallel transfer line toward an exterior of said device of claim 1 or toward a recovery unit.

* * * * *